April 30, 1968 S. LEHRER ETAL 3,380,300
ELECTROMAGNETIC FLOWMETER FOR ENGINE EXHAUST GASES
Filed May 28, 1965

STANLEY LEHRER
JOHN C. HOLME
INVENTORS

BY Ralph E. Bitner
ATTORNEY

United States Patent Office 3,380,300
Patented Apr. 30, 1968

3,380,300
ELECTROMAGNETIC FLOWMETER FOR ENGINE EXHAUST GASES
Stanley Lehrer and John C. Holme, Pompton Lakes, N.J., assignors to Astrosystems International, Inc., a corporation of New Jersey
Filed May 28, 1965, Ser. No. 459,577
3 Claims. (Cl. 73—194)

ABSTRACT OF THE DISCLOSURE

An electromagnetic flowmeter for the hot ionized gases issuing from the throat of a rocket or jet engine. Two adjustable electromagnetic windings create a magnetic field which separates ions and electrons in the gases and directs them to electrodes which are connected to a measuring circuit. The measuring circuit includes a noise filter, means for eliminating static charges prior to making a measurement, and an oscillograph for showing wave forms.

---

This invention relates to a means for measuring the velocity of very hot gases which may be discharged from a jet engine, a chemical rocket engine, or an ordinary piston type internal combustion engine. It has special reference to a device which produces an instantaneous response for gas velocities and therefore shows pulse wave forms.

Electromagnetic flowmeters have been used to measure the velocity of conducting liquids. Such devices include coils for generating a transverse magnetic field and two probes mounted at right angles to the flux lines. When direct current is applied to the coils, a voltage is generated across the two probes which is proportional to the rate of flow of the liquid. The present device uses a similar structure but alternating current is applied to the coils and an oscillograph is used to show the voltage generated between the probes. Because the probes are used with very hot gases, special precautions must be taken to eliminate noise and electrostatic charges.

One of the objects of this invention is to provide an improved flowmeter which can be used with very hot gases and which avoids one or more of the disadvantages and limitations of prior art arrangements.

Another object of the invention is to eliminate electrostatic charges from the probes which are used in a hot exhaust chamber.

Another object of the invention is to produce a wave form which shows the instantaneous velocity values present in a pulsed engine.

Another object of the invention is to reduce the weight of velocity measuring meters.

Another object of the invention is to determine the direction of the maximum velocity vector in a rocket engine exhaust.

Another object of the invention is to measure the equivalent series resistance of the gas path and thereby determine the mixture ratio.

The invention includes one or more windings positioned adjacent to an exhaust conduit containing moving gases, the temperature of which is greater than 1,500 degrees K. Two conductive probes are mounted in a non-conductive ring secured to the exhaust conduit. Voltage measuring circuitry are coupled to both probes and the output of this circuitry is connected to an oscillograph which shows wave forms.

One feature of the invention is the use of a short-circuiting relay which grounds the probes prior to a measuring operation. Another feature of the operation is the use of electrometer triodes mounted directly behind the probes and coupled to the measuring instrument by cathode follower circuits.

Another feature of the invention includes a circuit means which may be used to determine the mixture ratio. The circuit means includes a switch which connects a known resistance in shunt with the measuring circuit. The mixture ratio can be calculated from the two readings.

For a better understanding of the present invention, together with other and further objects thereof, reference is made to the following description taken in connection with the accompanying drawings.

Referring now to the figures, an exhaust conduit 10 delivers hot gases to the atmosphere. Directly above and below the end of the conduit are two coils of wire 11 and 12, these coils being designed to create a magnetic field which includes the entire cross sectional area of the conduit 10. It may be desirable to produce a uniform field but this is not necessary.

Figure 1:
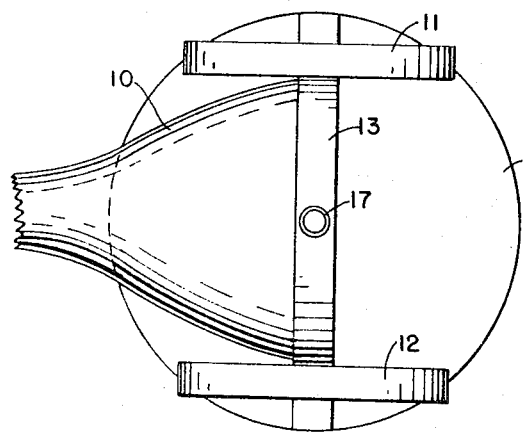
FIG. 1 is a side view of an exhaust conduit showing the probe positions and the two magnetic coils.
Figure 2:
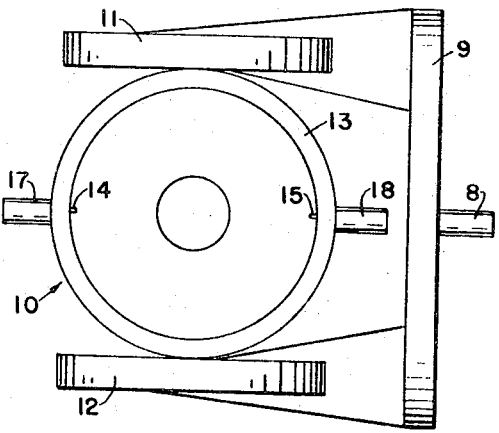
FIG. 2 is an end view of the exhaust conduit.

The two coils are secured to a bracket 9 which may be circular as shown in FIGURES 1 and 2. Any other form of mounting may be used. However, there may be times when the discharge gases are changed in direction to alter the missile direction and, if this occurs, it is important to determine the average direction of the gas flow. This angle is determined by mounting the coils and the bracket 9 on a shaft 8 which is rotatably mounted in a bearing (not shown) and arranged for angular movement about an axis which intersects both probe electrodes. When making an angular determination, the coils are rotated until the output voltage is a maximum.

The end of the conduit is connected to a non-conductive ring 13 which supports two probe electrodes 14 and 15. Each probe is connected to a supporting structure 16 including a hollow cylindrical tube 17 housing an insulator 20 and a triode 21 having a base 22 which is connected to a socket 23. A cable connects the socket terminals to an amplifier circuit 25, a power supply 26, and a meter device 27 which is preferably an oscillograph. Also within the shell 17 is a relay 28 containing two normally open contacts which may be closed by the application of a current controlled by an external switch 30.

Figure 3:
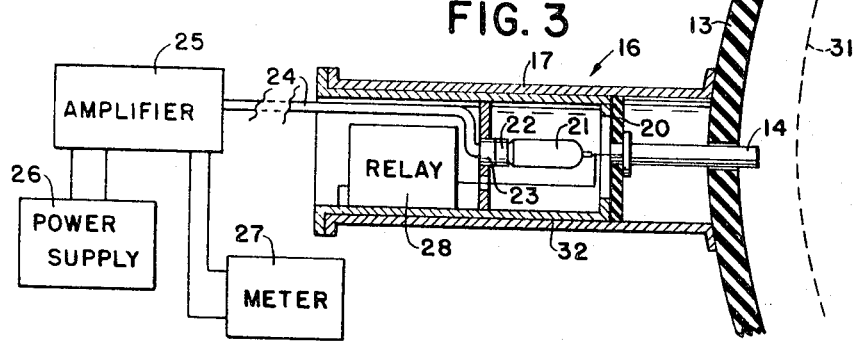
FIG. 3 is a cross sectional view of one of the probe structures showing the position of the electrometer tube and the short-circuiting relay.

The probe 14 extends only a short distance into the region of the very hot gases. The probe is not subject to melting or disintegration because it is within the layer of the boundary gases, generally defined by dotted line 31. This boundary layer is comparatively cool. As shown in FIG. 3, a second cylindrical shell 32 fits into shell 17 and carries all the electrical components including the disk insulator 20. The inner shell 32 may be removed easily for repair and cleaning.

Figure 4:
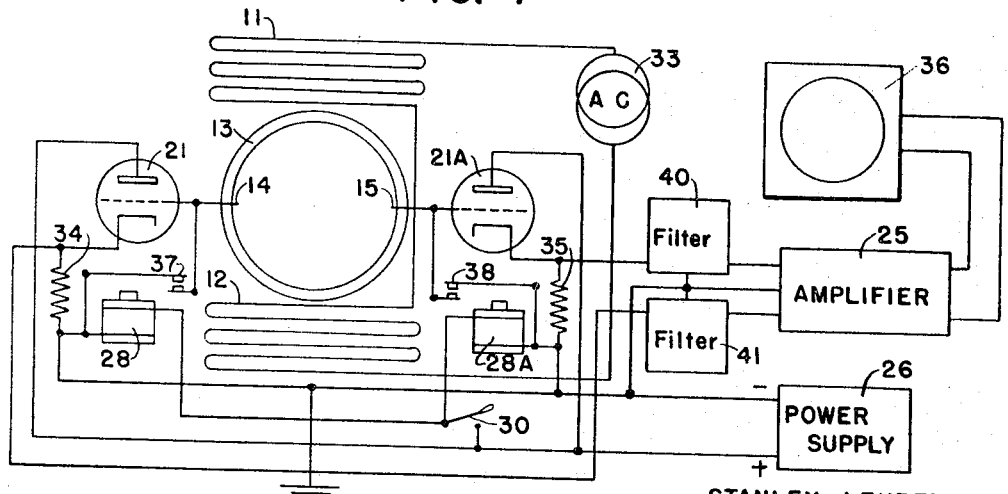
FIG. 4 is a schematic diagram of connections showing one method of coupling the probes to an oscillograph.

The circuit shown in FIG. 4 shows the details of one circuit connecting the probes to a meter. Coils 11 and 12 are connected in series with an alternating current supply 33 while the two triodes 21 and 21A each have their respective grids connected to probes 14 and 15. The anodes of these triodes are connected to the power supply 26 while their cathodes are connected to cathode follower resistors 34 and 35. The cathodes are also connected to the amplifier circuit 25 in series with filter circuits 40 and 41, and the oscillograph 36. It is obvious that a high resistance voltmeter may be substituted for the oscillograph to obtain an average gas velocity.

The operation of this device is as follows: after the engine has been in operation for a short time, switch 30 is closed, thereby grounding probes 14 and 15 by the action of relays 28 and 28A. This grounding operation eliminates the charges which may have accumulated due to frictional electricity. Then, when a reading is to be taken, switch 30 is opened, opening contacts 37 and 38 and permitting the transmittal of voltages from the two probes, through the two cathode follower amplifiers to amplifier 25 and the oscillograph 36. The magnetic field formed by the alternating current in coils 11 and 12 diverts the electrons toward one electrode during one-half cycle of the coil current and diverts the electrons toward the other electrode during the other half cycle. This action generates an alternating current voltage at the electrode terminals. The amplitude and wave form of this voltage is observed on the oscillograph screen.

There is always some noise present in the conductor leading to the amplifier 25. This noise may be caused by a number of side effects, such as frictional electricity, vibration, and vacuum tube noise. It is eliminated to a satisfactory degree by supplying alternating current to the coils 11 and 12 and then filtering the output by two sharply tuned filters 40 and 41 which transmit only the frequencies corresponding to the frequency of the supply generator 33.

The circuit shown in FIG. 4 can be modified to give a result which is proportional to the series resistance of the gas path between electrodes 14 and 15. This resistance is a function of the gas composition and, for any given set of conditions, proportional to the mixture ratio of the fuel and the oxidizer fluids. To determine this ratio, a shunt resistance is bridged around the measuring circuit and the output voltage again measured. The effective resistance of the gas path may then be determined from the formula, $$R_g = \frac{R_L R_S}{R_S R_L}\left(\frac{V_1}{V_2} - 1\right)$$

Where $R_g$ = the resistance of the gas path.
$V_1$ = voltage generated without the shunt resistance.
$V_2$ = voltage generated with the shunt resistance.
$R_L$ = the load resistance.
$R_s$ = the shunt resistance.

The mixture ratio may then be determined from a previous calibration of the system.

The foregoing disclosure and drawings are merely illustrative of the principles of this invention and are not to be interpreted in a limiting sense. The only limitations are to be determined from the scope of the appended claims.

We claim:

1. A measuring device for determining the velocity of a stream of ionized gas having a temperature above 1,500 degrees K.; said devices comprising a conduit for directing the ionized gas to an exit port, two windings mounted opposite to each other on either side of the conduit adjacent to the outside surface thereof, said windings axially aligned and having their axes aligned with a conduit diameter, a source of alternating current power connected to said windings for creating an alternating magnetic flux which extends through the conduit, a pair of electrodes mounted in the conduit wall and generally aligned with a conduit diameter which is disposed at right angles to said flux, a measuring circuit connected to said electrodes for measuring the alternating voltage generated across said electrodes, said measuring circuit including two high impedance amplifier circuits coupled respectively to said electrodes, an electric filter which passes only the alternating currents having a frequency equal to the frequency of the source, a switching means for short circuiting the input terminals of the two high impedance amplifiers prior to making a measurement, and an oscillograph which is connected for showing the amplitudes of the generated voltage.

2. A measuring device as claimed in claim 1 wherein said two windings are secured to a rotatable support for turning the windings to determine the direction of maximum gas flow, said support having an axis of rotation which is in line with the two electrodes.

3. A measuring device as claimed in claim 1 wherein said high impedance amplifier circuits are mounted in close proximity to said electrodes and wherein a pair of conductive shields respectively enclose both the electrode ends and the high impedance amplifier circuits.

References Cited
UNITED STATES PATENTS

| | | | |
|---|---|---|---|
| 3,119,259 | 1/1964 | Ten Bosch et al. | 73—194 X |
| 3,184,966 | 5/1965 | Thornton et al. | 73—194 |
| 3,210,642 | 10/1965 | Rosa | 310—11 X |
| 3,263,500 | 8/1966 | Krishnaswamy et al. | 73—194 |

RICHARD C. QUEISSER, *Primary Examiner.*

JAMES J. GILL, CHARLES A. RUEHL, *Examiners.*